US010938590B2

(12) United States Patent
Subramanian et al.

(10) Patent No.: US 10,938,590 B2
(45) Date of Patent: Mar. 2, 2021

(54) SYNCHRONIZING MULTI-HOMED NETWORK ELEMENTS FOR MULTICAST TRAFFIC

(71) Applicant: Cisco Technology, Inc., San Jose, CA (US)

(72) Inventors: Jayashree Subramanian, Cary, NC (US); Arvind Venkateswaran, San Jose, CA (US); Mankamana Prasad Mishra, Dublin, CA (US); Stig Ingvar Venaas, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 16/218,985

(22) Filed: Dec. 13, 2018

(65) Prior Publication Data

US 2020/0195454 A1 Jun. 18, 2020

(51) Int. Cl.
| | | |
|---|---|---|
| *H04L 12/18* | (2006.01) | |
| *H04L 12/761* | (2013.01) | |
| *H04L 12/46* | (2006.01) | |
| *H04L 12/753* | (2013.01) | |
| *H04L 12/801* | (2013.01) | |

(52) U.S. Cl.
CPC ........ *H04L 12/185* (2013.01); *H04L 12/1886* (2013.01); *H04L 12/4641* (2013.01); *H04L 45/16* (2013.01); *H04L 45/48* (2013.01); *H04L 47/15* (2013.01)

(58) Field of Classification Search
None
See application file for complete search history.

(56) References Cited

U.S. PATENT DOCUMENTS

| | | | |
|---|---|---|---|
| 6,988,146 B1 * | 1/2006 | Magret | H04L 12/185 455/433 |
| 8,259,563 B1 * | 9/2012 | Kothari | H04L 45/22 370/225 |
| 10,033,539 B1 | 7/2018 | Nagarajan et al. | |

(Continued)

FOREIGN PATENT DOCUMENTS

| | | |
|---|---|---|
| EP | 3276895 A1 | 1/2018 |
| EP | 3367619 A1 | 8/2018 |

OTHER PUBLICATIONS

B. Cain et al., "Internet Group Management Protocol, Version 3", Network Working Group, Oct. 2002, 53 pages.

(Continued)

*Primary Examiner* — Xavier S Wong
(74) *Attorney, Agent, or Firm* — Edell, Shapiro & Finnan, LLC

(57) ABSTRACT

A first network device joins a redundancy group of a multihomed network element that is connected to a computing device. The first network device detects an active link between the first network device and the computing device, and receives from the computing device, a subscription to a multicast flow. The first network device adds the subscription to a first list of active multicast subscriptions stored on the first network device. The first network device sends a unicast notification to a second network device of the multihomed network element. The unicast notification causes the subscription to be added to a second list of active multicast subscriptions stored on the second network device.

20 Claims, 7 Drawing Sheets

(56) References Cited

U.S. PATENT DOCUMENTS

| | | | | |
|---|---|---|---|---|
| 10,142,129 | B1* | 11/2018 | Gupta | H04L 12/4641 |
| 2015/0055662 | A1 | 2/2015 | Bhagavathiperumal et al. | |
| 2015/0249868 | A1* | 9/2015 | Wang | H04N 21/2396 |
| | | | | 725/27 |
| 2017/0289216 | A1* | 10/2017 | N | H04L 45/22 |
| 2018/0167315 | A1 | 6/2018 | Kanjariya et al. | |
| 2018/0248803 | A1* | 8/2018 | Nagarajan | H04L 47/18 |

OTHER PUBLICATIONS

Cisco, "Cisco Nexus 9000 Series NX-OS Interfaces Configuration Guide, Release 7.x", Chapter: Configuring vPCs, Oct. 12, 2018, 58 pages.

\* cited by examiner

SYNCHRONIZING MULTI-HOMED NETWORK ELEMENTS FOR MULTICAST TRAFFIC

TECHNICAL FIELD

The present disclosure relates to multicast traffic in networks with multihomed network elements.

BACKGROUND

Multihomed network elements allow a customer to receive network traffic from multiple network devices using a single network address. Typical multihomed network elements connect to a customer edge router via a link aggregation group (LAG), such as a multi-chassis LAG (MC-LAG). The customer edge router does not have visibility into which provider edge routers are connected to the LAG, or even how many provider edge routers are connected to the LAG.

Multicast networking deployments typically operate on a publish/subscribe model. A multicast source publishes multicast traffic in a multicast flow to a multicast group address, and any multicast receiver can subscribe to the multicast flow at the multicast group address. In one example, the multicast receivers send a subscription request identifying the multicast flow by the multicast address source S and the multicast group address G as a pair of addresses (S,G). Alternatively, a multicast receiver may use a wildcard for one of the addresses, such as (*,G), to subscribe to the multicast flow in group address from any source.

DESCRIPTION OF EXAMPLE EMBODIMENTS

Overview

Presented herein are techniques to support multicast flows in a multihomed network element. A first network device joins a redundancy group of a multihomed network element that is connected to a computing device. The multihomed network element comprises a plurality of network devices. The first network device detects an active link between the first network device and the computing device and receives from the computing device, a subscription to a multicast flow. The first network device adds the subscription to a first list of active multicast subscriptions stored on the first network device. The first network device sends a unicast notification to a second network device in the plurality of network devices of the multihomed network element. The unicast notification causes the subscription to be added to a second list of active multicast subscriptions stored on the second network device.

DETAILED DESCRIPTION

Layer 3 multicast deployments (e.g., closed circuit television or Internet Protocol (IP) television) may use multihomed network elements to provide faster convergence in case of access failure (e.g., in an active/standby configuration) or for load balancing and using link bandwidth toward access (e.g., in an active/active configuration). In some examples, a layer 2 overlay network may provide multicast, multihomed capabilities using Inter-Control Center Protocol (ICCP) or Border Gateway Protocol (BGP)/Ethernet Virtual Private Network (EVPN). The techniques presented herein provide for layer 3 multihomed, multicast support without requiring a layer 2 overlay network by synchronizing the layer 3 multicast state (e.g., Internet Group Management Protocol (IGMP) state) across participant of a redundancy group.

The techniques presented herein support either active/active configurations or active/standby configurations. In an active/active configuration, all of the network devices in a multihomed network forward traffic to the customer edge router. In contrast, when a multihomed network element is in an active/standby configuration, only one device of the multihomed network element forwards traffic to the customer router, while one or more other network devices are in standby mode ready to forward traffic to the customer router if the active device loses access to the customer router (e.g., the link between the active network device and the customer router goes down).

Figure 1:
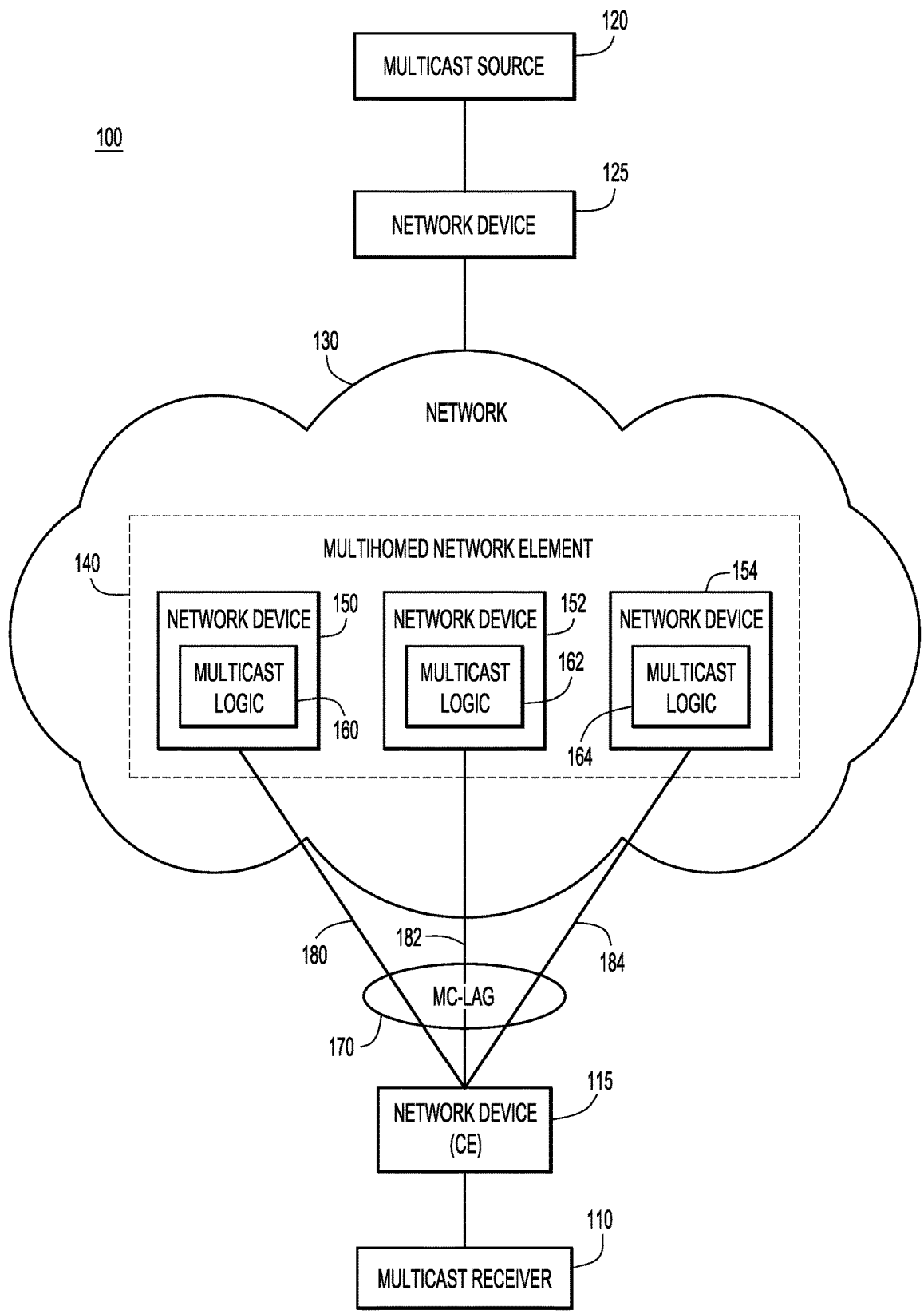
FIG. 1 is a system block diagram illustrating a multihomed network system that provides multicast support, according to an example embodiment.

Using the techniques presented herein, all of the hosts in a multihomed network element will receive multicast traffic for any multicast flows that any host requests. The traffic will be dropped on any standby hosts and forwarded by the active host. In an active/active configuration for the multihomed network element, one of the hosts will be the designated forwarder, and the other hosts will drop the multicast traffic. Sending the traffic to all of the hosts of the multihomed network element minimizes the switchover time and loss of multicast traffic Referring now to FIG. 1, a simplified block diagram illustrates a system 100 configured to deliver multicast traffic to a multicast receiver 110. The multicast receiver 110 is behind a network device 115, such as a customer edge (CE) router, that is configured to subscribe to a multicast flow from a multicast source 120. The multicast source 120 provides the multicast traffic for the multicast flow to a network device 125 in the provider network 130. The network 130 includes a multihomed network element 140 comprising network devices 150, 152, and 154.

The network devices 150, 152, and 154 each include multicast logic 160, 162, and 164, respectively, to synchronize the multicast subscription state across the multihomed network element 140. The multihomed network element 140 is connected to the CE network device 115 by an MC-LAG 170 comprising network links 180, 182, and 184. In one example, the network devices 150, 152, and 154 each have a layer 3 sub-interface configured to communicate over links 180, 182, and 184, respectively, to the CE network device 115. The layer 3 sub-interface on each of the network devices 150, 152, and 154 is configured for multicast routing by the multicast logic 160, 162, and 164, respectively.

In one example, a multicast interface in a multihomed setting may be uniquely identified by a Redundancy Group Identifier (RGID), a bundle identifier, and an Ethernet tag. The RGID identifies a redundancy group of network devices (e.g., network devices 150, 152, and 154) participating in a link aggregation group (e.g., MC-LAG 170). The bundle identifier is associated with the MC-LAG main interface, and each interface within a redundancy group uses the same bundle identifier. The Ethernet tag identifies a virtual local area network (VLAN) interface configured on the MC-LAG interface.

In any given topology, a network device will typically participate in a relatively few number of redundancy groups. Similarly, the number of network devices participating in each redundancy group is also typically low (e.g., two or three). The network administrator may reserve N multicast addresses in the reserved range, where N is the maximum number of redundancy groups in the topology. For instance, the IP address 224.0.0.RGID' may be used to communicate between network devices in the redundancy group, where RGID' is a numerical derivation of RGID. The redundancy group membership on each network device may be established at configuration time, when the redundancy group peers are specified.

In another example, the network devices in the redundancy group may communicate using unicast routing (e.g., instead of a reserved multicast address for IGMP). For instance, a dedicated loopback address for each network device may be used for this purpose. Since the redundancy group IGMP messages are unicast between the network devices in the redundancy group, synchronizing the multicast subscriptions between the network devices is independent of the type of network that exists between the network devices.

In a further example, existing IGMP reports may be used to synchronize the active multicast subscriptions across the redundancy group. The auxiliary data in the IGMP reports may be used to provide the RGID, bundle identifier, and Ethernet tag context for each of the groups in the records. The redundancy group reports may be IGMP CurrentStqateRecord (CurrSR) reports or ChangeStateRecord (ChgSR) reports. These redundancy group reports may be sent with a destination address of the reserved group address for that redundancy group. The receiving network devices may determine whether the network device is participating in the redundancy group indicated in the auxiliary data in order to determine whether to discard or accept the report. The MC-LAG interface on each receiving network device may be down or in a standby state with regard to the multicast route. For each included record, the receiving network device adds the multicast route, and adds the MC-LAG interface/sub-interface as the Outgoing Interface (OIF) if the MC-LAG is in a standby state. The network device will not typically add the MC-LAG as the OIF for the multicast route if the MC-LAG is down.

Figure 2:
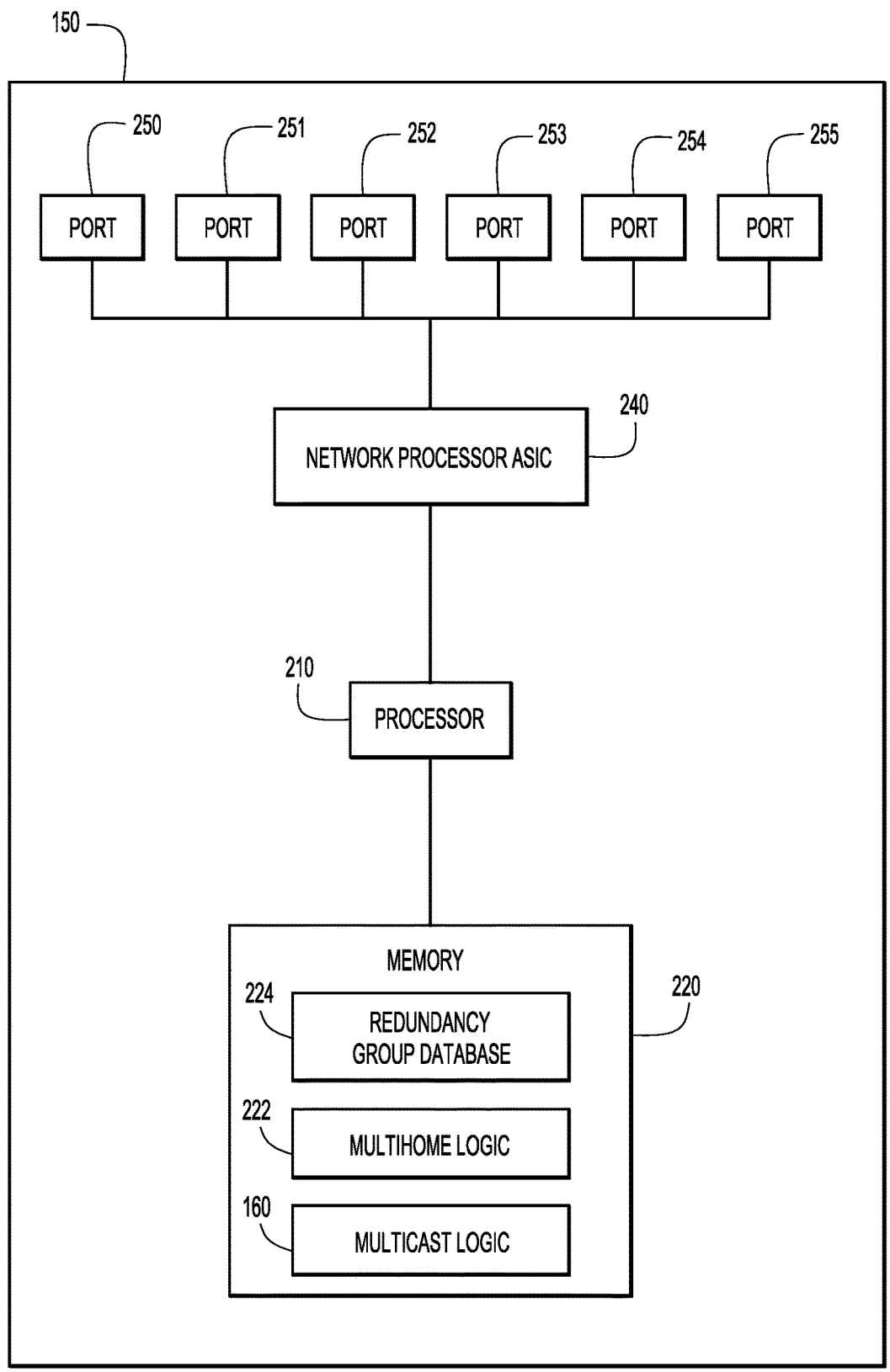
FIG. 2 is a simplified block diagram of a network device that may be configured to perform the methods presented herein, according to an example embodiment.

Referring now to FIG. 2, a simplified block diagram is shown of the network element 150 configured to perform the multihomed, multicast techniques described herein. Network elements 152 and 154 may also be described with similar elements as shown in FIG. 2. Network element 150 includes, among other possible components, a processor 210 to process instructions relevant to maintaining network connections, and memory 220 to store a variety of data and software instructions (e.g., multihomed logic 222, redundancy group database 224, multicast logic 150, communication packets, etc.). The network element 150 also includes a network processor application specific integrated circuit (ASIC) 240 to process communication packets that flow through the network element 150. Network processor ASIC 240 processes communication packets be sent to and received from ports 250, 251, 252, 253, 254, and 255. While only six ports are shown in this example, any number of ports may be included in network element 150. Additionally, the processor 210 may define virtual ports that communicate via one or more of the physical ports 250, 251, 252, 253, 254, and 255.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (e.g., by the processor 210) it is operable to perform the operations described herein.

It is to be understood that the network element 150 may be a physical device or a virtual (software) device. In the latter case, the network element 150 is embodied as software running on a compute node (e.g., in a datacenter or other environment) through which traffic is directed.

Figure 3:
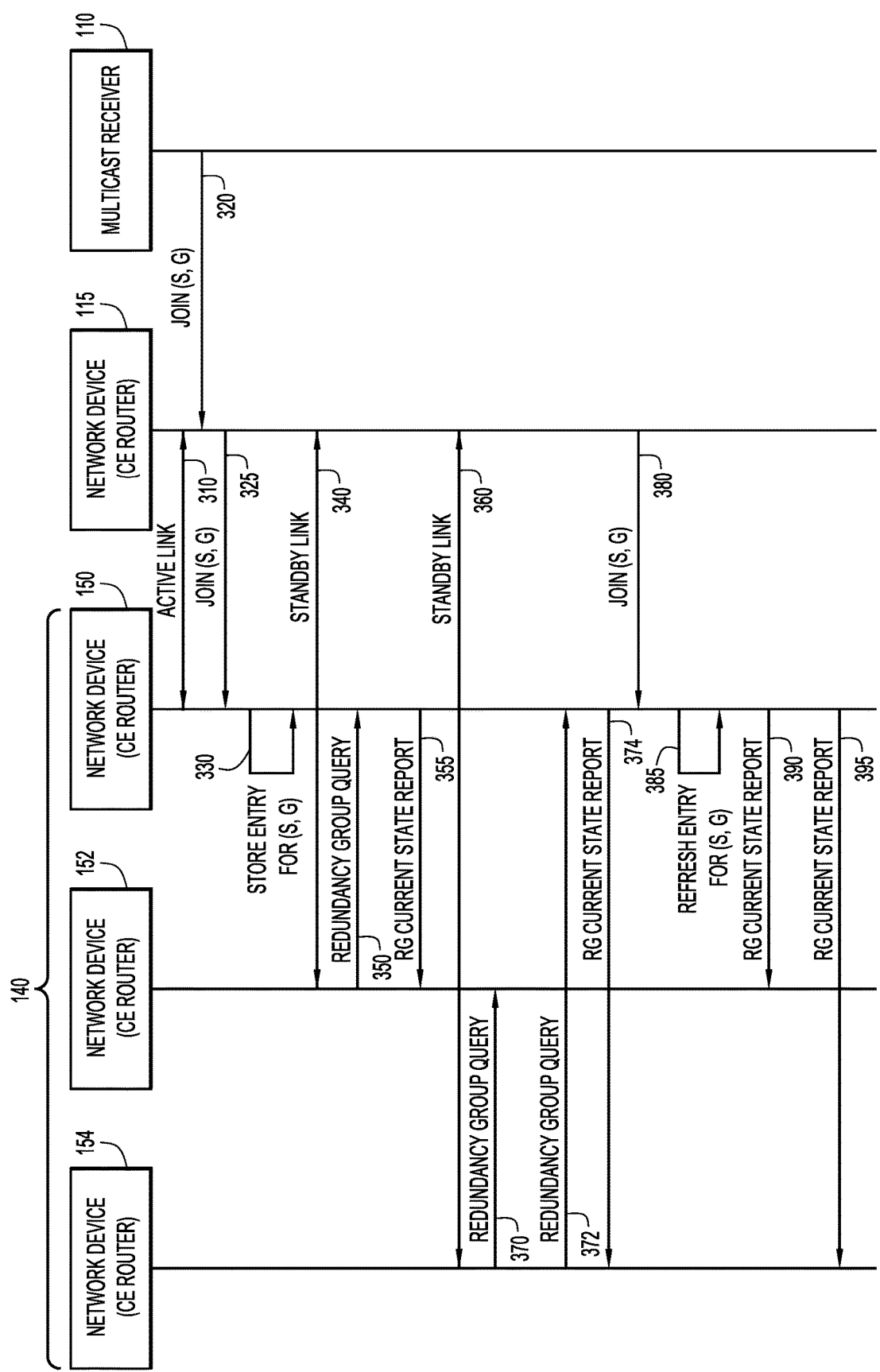
FIG. 3 is a message flow diagram showing messages between network elements to synchronize the multicast subscriptions across the network devices in a multihomed network element as the network devices come online, according to an example embodiment.

Referring now to FIG. 3, a message flow diagram shows messages exchanged between network devices and a multicast receiver to subscribe to a multicast flow across a multihomed network element. Initially, a network device 150 in the multihomed network element 140 establishes an active link 310 with the network device 115 (e.g., the CE router attached to the multicast receiver 110). The multicast receiver 110 sends a subscription request 320 for a particular multicast flow to the network device 115. In one example, the subscription request 320 is an IGMP request to join the membership group for the multicast flow (S,G). In another example, multiple multicast receivers (not shown) may send subscription requests (e.g. analogous to subscription request 320) for the same multicast flow to the network device 115. The network device 115 forwards a subscription request 325 to the multihomed network element 140. In one example, the subscription request 325 is hashed among the network devices of the multihomed network element to the network device 150. In response to receiving the subscription request 325, the network device stores an entry 330 for the multicast flow (e.g., traffic identified by the address pair (S,G) to a list of active multicast subscriptions.

When the network device 152 comes online and joins the multihomed network element 140, the link 340 between the network device 115 and the network device 152 is in a standby configuration. In other words, the network device 152 will not handle traffic directed to or from the network device 115 unless the active link 310 is broken. However, to ensure a fast convergence for multicast traffic when the active link 310 does go down, the network device 152 sends a redundancy group query 350 to the network device 150 (i.e., the other network device in the redundancy group). The network device 150 responds with a redundancy group current state report 355 that indicates that the multihomed network element 140 includes an active multicast subscription to the multicast flow (S,G).

Similarly, when the network device 154 comes online and joins the multihomed network element 140, the link 360 between the network device 115 and the network device 154 is in a standby configuration. In other words, the network device 154 will not handle traffic directed to or from the network device 115 unless the active link 310 is broken. However, to ensure a fast convergence for multicast traffic when the active link 310 does go down, the network device 154 sends a redundancy group query 370 to the network device 152 and a redundancy group query 372 to the network device 150 (i.e., the other network devices in the redundancy group). The network device 150 responds with a redundancy group current state report 374 that indicates that the multihomed network element 140 includes an active multicast subscription to the multicast flow (S,G). The network device 152 may also respond with a redundancy group current state report, which is not shown in FIG. 3. Since the redundancy group state is already synchronized between the network device 150 and the network device 152, the two state reports would contain the same list of active multicast subscriptions.

As long the network device 115 is connected to a host (e.g., multicast receiver 110) that maintains an active subscription to the multicast flow (S,G), the network device 115 may periodically send a subscription request 380 to the multihomed network element 140 (e.g., at the network device 150). The subscription request 380 causes the network device 150 to refresh the entry 385 for the subscription to the multicast flow (S,G). To synchronize the list of active multicast subscriptions in the other network device 152 and 154 of the multihomed network element 140, the network device 150 sends state reports 390 and 395 to the network devices 152 and 154, respectively.

In one example, the multicast subscription database is a soft state protocol, such as IGMP. In other words, the entries of active multicast routes expire if they are not periodically refreshed. In contrast, a hard state protocol, such as BGP, maintains multicast routes until they are explicitly removed.

In another example, when a node (e.g., network device 152 or 154) comes up, the node may initiate a redundancy group specific query that will initiate a synchronization of the active multicast subscriptions from the active network device (e.g., network device 150). The redundancy group query may be unicast to each peer within the redundancy group. When a network device (e.g., network device 150) receives an IGMP join from a receiver (e.g., network device 115) on the MC-LAG interface, the network device may initiate an IGMP state synchronization between the devices in the redundancy group by generating a redundancy group report. The network device may be configured to originate the synchronization based on the expected resiliency of the network.

Figure 4:
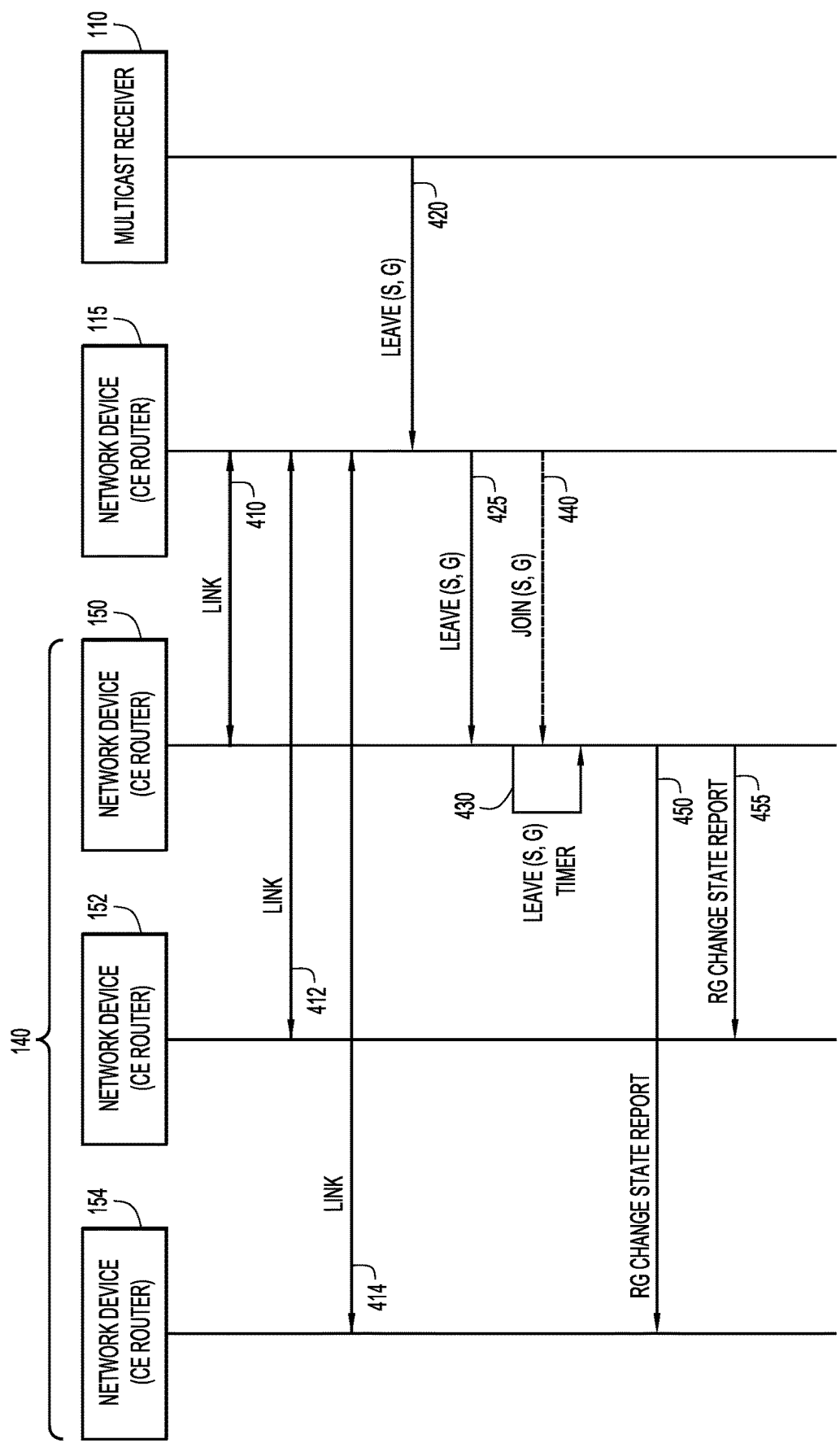
FIG. 4 is a message flow diagram showing messages between network elements to synchronize the multicast subscriptions across the network devices in a multihomed network element in response to explicit request to unsubscribe from the multicast flow, according to an example embodiment.

Referring now to FIG. 4, a message flow diagram shows messages exchanged between network devices and a multicast receiver when the multicast receiver explicit unsubscribes from the multicast flow. Initially, the network devices 150, 152, and 154 of the multihomed network element 140 establishes links 410, 412, and 414, respectively, with the network device 115. In one example, the multihomed network element 140 may be configured in an active/standby mode, with the link 410 as the active link and the links 412 and 414 as the standby links. Alternatively, the multihomed network element 140 may be configured in an active/active mode, with all of the links 410, 412, 414 being active.

When the multicast receiver 110 no longer needs to receive a particular multicast flow (S,G), the multicast receiver 110 sends an unsubscribe request 420 to the network device 115. If no other multicast receiver behind the network device 115 has an active subscription to the multicast flow, then the network device 115 sends an unsubscribe message 425 to the multihomed network element 140. The network device 150 receives the unsubscribe message 425 and processes the unsubscribe request 425 to remove the active subscription after a timer 430 expires. In one example, the timer 430 expires after the minimum response time of the soft state protocol used to handle the multicast subscriptions. If the network device 115 sends a subscription request 440 for the multicast flow (S,G) before the timer expires (e.g., if another multicast receiver subscribes to the multicast flow), then the network device 150 maintains the active multicast subscription, and continues to forward any multicast traffic for the subscribed multicast flow to the network device 115.

Once the timer 430 has expired, the network device 150 removes the entry for the multicast flow form the list of active multicast subscriptions, and send redundancy group change state reports 450 and 455 to the network devices 152 and 154, respectively (i.e., to the other network devices in the redundancy group of the multihomed network element). The state reports 450 and 455 synchronize the lists of active multicast subscriptions in the network devices 152 and 154, removing the entry for the unsubscribed multicast flow (S,G).

Figure 5:
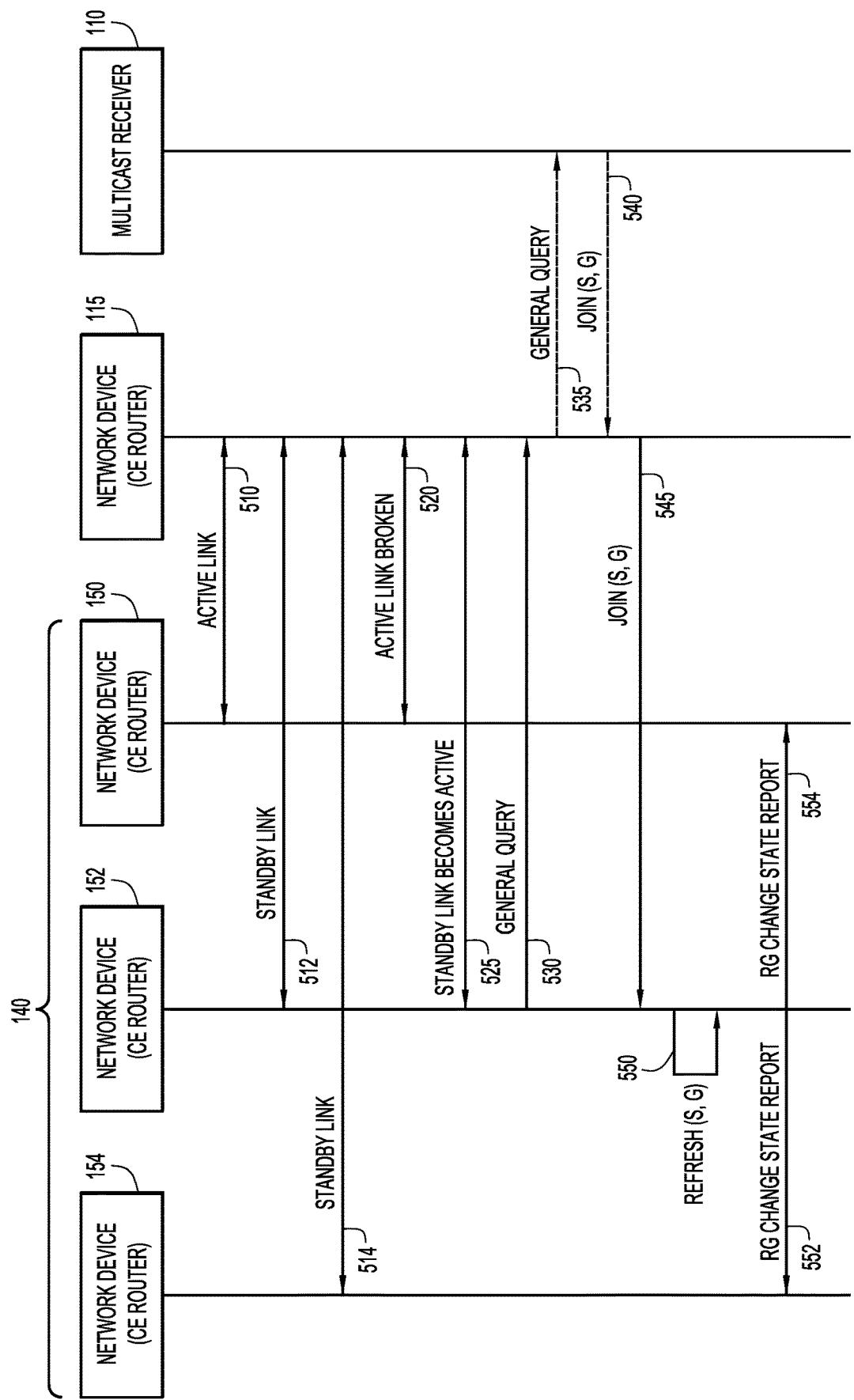
FIG. 5 is a message flow diagram showing messages between network elements to synchronize the multicast subscriptions across a multihomed network element when the active link of the multihomed network element fails, according to an example embodiment.

Referring now to FIG. 5, a message flow diagram shows messages exchanged between network devices and a multicast receiver to maintain the multicast flow when the active link for the multihomed network element goes down. Initially, the network devices 150, 152, and 154 of the multihomed network element 140 establishes links 510, 512, and 514, respectively, with the network device 115. The multihomed network element 140 is configured in an active/standby mode, with the link 510 as the active link and the links 512 and 514 as the standby links.

When the active link 510 is broken at 520, the standby link 412 becomes the active link 525 between the network device 152 of the multihomed network element 140 and the network device 115. In one example, the network device 150 may have failed, causing the active link 510 to be broken. Alternatively, the network connection between the network device 150 and the network device 115 may have failed, causing the active link 510 to be broken. In order to maintain the active multicast subscription, the network device 152 sends a general query 530 to the network device 115 to determine whether the multicast subscription still has an active receiver. The network device 115 may send a general query 535 to the multicast receiver 110 to determine if the subscription to the multicast flow should be refreshed. The multicast receiver 110 responds with a subscription message 540 to maintain the multicast flow subscription. Similarly, the network device 115 responds to the general query 530 by sending a subscription request 545 to the network device 152.

The network device 152 refreshes the multicast subscription entry 550, and sends redundancy group state reports 552 and 554 to the network devices 154 and 150, respectively. The network device 150 and 154 then update their respective lists of active multicast subscriptions.

Figure 6:
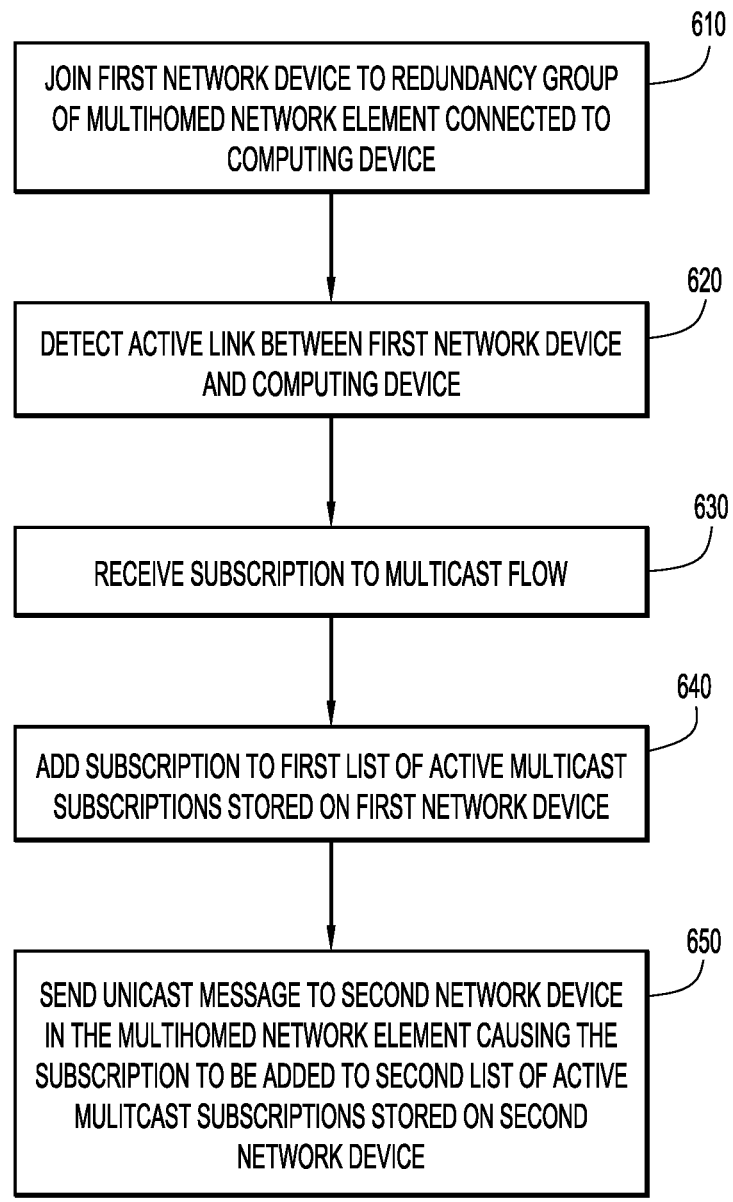
FIG. 6 is a flowchart illustrating operations of a first network device in synchronizing active multicast subscriptions with a second network device, according to an example embodiment.

Referring now to FIG. 6, a flowchart illustrates operations performed by a first network device of a multihomed network element in a process 600 to synchronize active multicast subscriptions with a second network device of the multihomed network element. At 610, the first network device joins a redundancy group of a multihomed network element connected to a computing device (e.g., network device 115). The multihomed network element comprises a plurality of network devices, including the first network device. At 620, the first network device detects an active link between the first network device and the computing device. In one example, the first network device may be the active link between the computing device and the multihomed network element in an active/standby configuration. Alternatively, the first network device may be a designated forwarder (e.g., for a particular multicast flow) with an active link between the computing device and the multihomed network element in an active/active configuration.

At 630, the first network device receives from the computing device, a subscription to a multicast flow. In one example, the subscription may be an IGMP join message identifying a source and group address for the multicast flow. At 640, the first network device adds the subscription to a first list of active multicast subscriptions stored on the first network device. In one example, the subscription may be stored as an entry in an IGMP database of active multicast routes.

At 650, the first network device sends a unicast notification to a second network device in the plurality of network devices of the multihomed network element. The unicast notification causes the subscription to be added to a second list of active multicast subscriptions stored on the second network device. In one example, the unicast notification may be an IGMP report with auxiliary data that synchronizes the multicast routes of active multicast flows to the multihomed network element.

Figure 7:
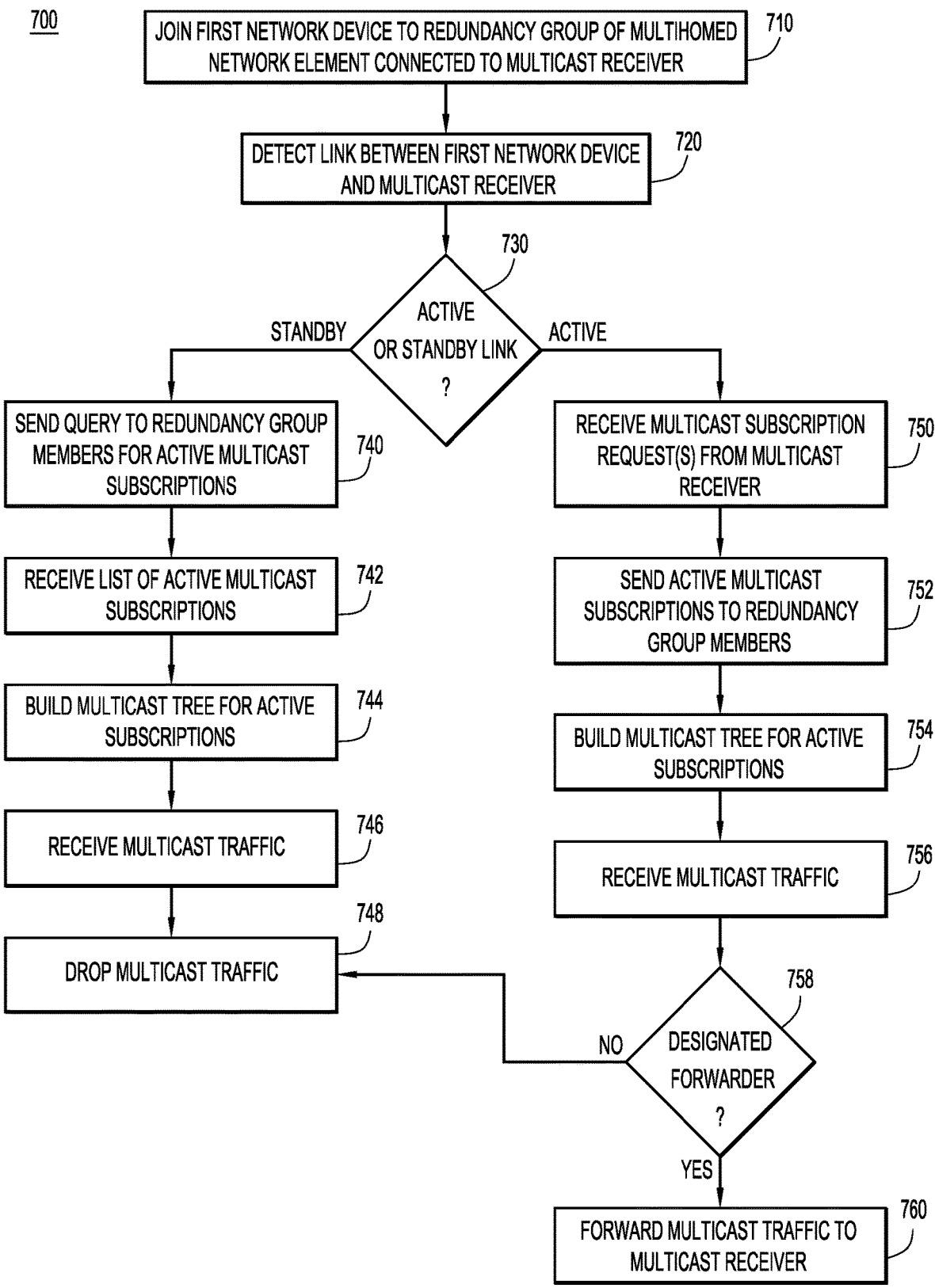
FIG. 7 is a flowchart illustrating operations of a first network device providing multicast traffic, according to an example embodiment.

Referring now to FIG. 7, a flowchart illustrates operations performed by a first network device of a multihomed network element in a process 700 to forward multicast traffic to a multicast receiver. At 710, the first network device joins a redundancy group of a multihomed network element connected to a multicast receiver (e.g., network device 115). The multihomed network element comprises a plurality of network devices, including the first network device. At 720, the first network device detects a link between the first network device and the multicast receiver, and determines whether the link is an active link or a standby link at 730 based on the configuration of the multihomed network element.

If the link is detected to be a standby link at 730, then the first network device sends a query at 740 to the members of the redundancy group to determine any active multicast subscriptions. In one example, the query may be an IGMP general membership query. At 742, the first network device receives a list of active multicast subscriptions. In one example, the first network device may receive an IGMP membership report from each of the redundancy group members. The IGMP membership report may include auxiliary data that identifies each of the active multicast flows to which the multihomed network element is subscribed.

Based on the list of active multicast subscriptions, the first network device builds a multicast tree for each of the active multicast subscriptions at 746. In one example, the first network device may build a Protocol-Independent Multicast (PIM) tree. Since the first network device does not have an active link to the multicast receiver, as determined at 730, the first network device may need to spoof an active link to build the multicast tree. At 746, the first network device receives multicast traffic for the multicast flows with active subscriptions. Since the first network device does not have an active link to the multicast receiver in this branch of the process 700, the first network device drops the multicast traffic at 748.

If the link between the first network device and the multicast receiver is determined to be an active link at 730, then the first network device receive at least one multicast subscription request at 750. At 752, the first network device sends a list of active multicast subscriptions to the other members of the redundancy group. In one example, the first network device may send unicast IGMP membership reports to each of the network devices in the multihomed network element.

At 754, the first network device builds a multicast tree for each of the active multicast subscriptions. In one example, the first network device may build a Protocol-Independent Multicast (PIM) tree. At 756, the first network device receives multicast traffic for the multicast flows with active subscriptions. If the first network device is the designated forwarder for a particular multicast flow, as determined at 758, then the first network device forwards the multicast traffic for that particular multicast flow to the multicast receiver at 760. If the first network device is not the designated forwarder for a particular multicast flow, then the first network device drops the multicast traffic for that particular multicast flow at 748. In one example, the designated forwarder may be determined as a function of the number of active network devices for the MC-LAG, the multicast source address, the multicast group address, and/or the loopback addresses of the network devices in the redundancy group.

In summary, the techniques presented herein provide for an in-band mechanism in IGMP to synchronize multicast route databases across hosts participating in a multihomed network element. The techniques are effective for both active/standby configurations and active/active configurations, as well as for an arbitrary number of hosts in the multihomed network element. These techniques provide efficient layer 3 native multicast support for multihomed deployments without the need for additional overlay technologies.

In one form, a method is provided to support multicast flows in a multihomed network element. The method comprises a first network device joining a redundancy group of the multihomed network element that is connected to a computing device. The multihomed network element comprises a plurality of network devices. The method also includes detecting an active link between the first network device and the computing device and receiving from the computing device, a subscription to a multicast flow. The method further includes adding the subscription to a first list of active multicast subscriptions stored on the first network device. The method also includes sending a unicast notification to a second network device in the plurality of network devices of the multihomed network element. The unicast notification causes the subscription to be added to a second list of active multicast subscriptions stored on the second network device.

In another form, an apparatus is provided comprising a network interface, a memory, and a processor. The network interface is configured to send network communications to a from computing devices over a computer network. The processor is configured to join the apparatus to a redundancy group of a multihomed network element comprising a plurality of network devices. The processor is also configured to detect an active link between the network interface and the computing device. The processor is further configured to receive from the computing device, via the network interface, a subscription to a multicast flow. The processor is configured to add the subscription to a first list of active multicast subscriptions stored in the memory. The processor is also configured to cause the network interface to send a unicast notification to at least one other network device in the plurality of network devices of the multihomed network element. The unicast notification causes the subscription to be added to a second list of active multicast subscriptions stored on the other network device.

In yet another form, a system comprises a multihomed network element of a plurality of network devices connected to a computing device. The system includes a first network device among the plurality of network devices, which is configured to join a redundancy group of the multihomed network element. The first network device is also configured to detect an active link between the first network device and the computing device. The first network device is further configured to receive from the computing device, a subscription to a multicast flow. The first network device is configured to add the subscription to a first list of active multicast subscriptions stored on the first network device. The first network device is also configured to send a unicast notification to a second network device in the plurality of network devices of the multihomed network element. The unicast notification causes the subscription to be added to a second list of active multicast subscriptions stored on the second network device.

In still another form, a non-transitory, computer readable storage media is provided that is encoded with instructions that, when executed by a processor, cause the processor to perform any of the methods described and shown herein.

The above description is intended by way of example only. In particular, references to specific network protocols, such as IGMP and PIM, are non-limiting examples of network environments in which the techniques presented herein may be applied. The techniques described herein may also be applied in other network environments using other networking protocols.

What is claimed is:

1. A method comprising:
   at a first network device, joining a redundancy group of a multihomed network element connected to a computing device, the multihomed network element comprising a plurality of network devices;
   detecting an active layer 3 link between the first network device and the computing device;
   receiving from the computing device, a subscription to a layer 3 multicast flow;
   adding the subscription to a first list of active multicast subscriptions stored on the first network device; and
   sending a layer 3 unicast notification to a second network device in the plurality of network devices of the multihomed network element, the layer 3 unicast notification causing the subscription to be added to a second list of active multicast subscriptions stored on the second network device.

2. The method of claim 1, further comprising:
   periodically receiving a first update message from the computing device to refresh the subscription to the layer 3 multicast flow; and
   periodically sending a second update message to the second network device to refresh the subscription to the layer 3 multicast flow at the second network device.

3. The method of claim 1, further comprising:
   receiving a first update message from the computing device to remove the subscription to the layer 3 multicast flow;
   removing the subscription from the first list of active multicast subscriptions stored on the first network device; and
   sending a second update message to the second network device to remove the subscription to the layer 3 multicast flow from the second list of active multicast subscriptions stored on the second network device.

4. The method of claim 1, further comprising:
   building a multicast tree to a source of the layer 3 multicast flow;
   receiving multicast traffic from the source of the layer 3 multicast flow; and
   forwarding the multicast traffic to the computing device.

5. The method of claim 1, wherein the multihomed network element is configured in an active/active configuration such that each of the plurality of network devices includes an active layer 3 link to the computing device.

6. The method of claim 5, wherein the layer 3 unicast notification includes an indication that the first network device is a designated forwarder device among the plurality of network devices of the multihomed network element for the layer 3 multicast flow.

7. An apparatus comprising:
   a network interface configured to send network communications to and from computing devices over a computer network;
   a memory; and
   a processor configured to:
      join the apparatus to a redundancy group of a multihomed network element connected to a computing device, the multihomed network element comprising a plurality of network devices;
      detect an active layer 3 link between the network interface and the computing device;
      receive from the computing device, via the network interface, a subscription to a layer 3 multicast flow;
      add the subscription to a first list of active multicast subscriptions stored in the memory; and
      cause the network interface to send a layer 3 unicast notification to at least one other network device in the plurality of network devices of the multihomed network element, the layer 3 unicast notification causing the subscription to be added to a second list of active multicast subscriptions stored on the other network device.

8. The apparatus of claim 7, wherein the processor is further configured to:
   periodically receive a first update message from the computing device, via the network interface, the first update message refreshing the subscription to the layer 3 multicast flow; and
   periodically cause the network interface to send a second update message to the other network device to refresh the subscription to the layer 3 multicast flow at the other network device.

9. The apparatus of claim 7, wherein the processor is further configured to:
receive a first update message from the computing device, via the network interface, the first update message to remove the subscription to the layer 3 multicast flow;
remove the subscription from the first list of active multicast subscriptions stored in the memory; and
cause the network interface to send a second update message to the other network device to remove the subscription to the layer 3 multicast flow from the second list of active multicast subscriptions stored on the other network device.

10. The apparatus of claim 7, wherein the processor is further configured to:
build a multicast tree to a source of the layer 3 multicast flow;
receive multicast traffic from the source of the layer 3 multicast flow via the network interface; and
cause the network interface to forward the multicast traffic to the computing device.

11. The apparatus of claim 7, wherein the multihomed network element is configured in an active/active configuration such that each of the plurality of network devices includes an active layer 3 link to the computing device.

12. The apparatus of claim 11, wherein the layer 3 unicast notification includes an indication that the apparatus is a designated forwarder device among the plurality of network devices of the multihomed network element for the layer 3 multicast flow.

13. A system comprising:
a multihomed network element comprising a plurality of network devices connected to a computing device;
a first network device among the plurality of network devices, the first network device configured to:
join a redundancy group of the multihomed network element;
detect an active layer 3 link between the first network device and the computing device;
receive from the computing device, a subscription to a layer 3 multicast flow;
add the subscription to a first list of active multicast subscriptions stored on the first network device; and
send a layer 3 unicast notification to a second network device in the plurality of network devices of the multihomed network element, the layer 3 unicast notification causing the subscription to be added to a second list of active multicast subscriptions stored on the second network device.

14. The system of claim 13, wherein the first network device is further configured to:
periodically receive a first update message from the computing device to refresh the subscription to the layer 3 multicast flow; and
periodically send a second update message to the second network device to refresh the subscription to the layer 3 multicast flow at the second network device.

15. The system of claim 13, wherein the first network device is further configured to:
receive a first update message from the computing device to remove the subscription to the layer 3 multicast flow;
remove the subscription from the first list of active multicast subscriptions stored on the first network device; and
send a second update message to the second network device to remove the subscription to the layer 3 multicast flow from the second list of active multicast subscriptions stored on the second network device.

16. The system of claim 13, wherein the first network device is further configured to:
build a multicast tree to a source of the layer 3 multicast flow;
receive multicast traffic from the source of the layer 3 multicast flow; and
forward the multicast traffic to the computing device.

17. The system of claim 13, wherein each particular network device of the plurality of network devices in the redundancy group of the multihomed network element is further configured to:
build a multicast tree to a source of the layer 3 multicast flow;
receive multicast traffic from the source of the layer 3 multicast flow; and
responsive to a determination that the particular network device is not a designated forwarder for the layer 3 multicast flow, drop the multicast traffic.

18. The system of claim 13, wherein the multihomed network element is configured in an active/active configuration such that each of the plurality of network devices includes an active layer 3 link to the computing device.

19. The system of claim 18, wherein the layer 3 unicast notification includes an indication that the first network device is a designated forwarder device among the plurality of network devices of the multihomed network element for the layer 3 multicast flow.

20. The system of claim 13, wherein the unicast notification comprises an Internet Group Management Protocol (IGMP) report with auxiliary data identifying the subscription to the layer 3 multicast flow.

* * * * *